United States Patent [19]

Ackley

[11] 4,211,818
[45] Jul. 8, 1980

[54] COMPOSITE STRANDS OF RESIN, CARBON AND GLASS AND PRODUCT FORMED FROM SAID STRANDS

[75] Inventor: Richard H. Ackley, Oakmont, Pa.

[73] Assignee: PPG Industries, Inc., Pittsburgh, Pa.

[21] Appl. No.: 8,671

[22] Filed: Feb. 2, 1979

Related U.S. Application Data

[63] Continuation-in-part of Ser. No. 856,149, Nov. 30, 1977, Pat. No. 3,167,429.

[51] Int. Cl.² .................. B32B 9/00; D02G 3/00
[52] U.S. Cl. .................. 428/367; 428/222; 428/288; 428/377; 428/378; 428/392
[58] Field of Search .............. 428/367, 375, 377, 392, 428/288, 371, 222, 224, 378; 57/240, 238, 249, 244, 241, 250, 251

[56] References Cited

U.S. PATENT DOCUMENTS

| 3,390,037 | 6/1968 | Christie | 156/173 X |
| 3,576,705 | 4/1971 | Goldsworthy | 428/377 |
| 3,908,042 | 9/1975 | Heissler et al. | 428/367 X |
| 3,956,564 | 5/1976 | Hillig | 428/366 |
| 3,966,864 | 6/1976 | Stenzenberger | 156/175 X |
| 4,061,806 | 12/1977 | Lindler | 428/367 |
| 4,065,597 | 12/1977 | Gillespie | 156/42 X |
| 4,079,165 | 3/1978 | Morley | 428/367 X |

*Primary Examiner*—Lorraine T. Kendell
*Attorney, Agent, or Firm*—Paul A. Leipold; John E. Curley

[57] ABSTRACT

Composite strands of resin, carbon and glass and resin sheets reinforced by glass and carbon strands are described. In the process of forming the composite strands and sheets glass strands are passed through a die as they emerge from the bath to control their resin content and wound on a mandrel. The carbon strands are passed directly into the die and are wetted by the resin in the die and on the mandrel. The composite strands of resin and glass and carbon strands are laid on the mandrel with resin to provide a fiber reinforced resin sheet.

19 Claims, 3 Drawing Figures

COMPOSITE STRANDS OF RESIN, CARBON AND GLASS AND PRODUCT FORMED FROM SAID STRANDS

CROSS REFERENCE TO RELATED APPLICATIONS

This application is a continuation in part of U.S. patent application Ser. No. 856,149 filed Nov. 30, 1977 now U.S. Pat. No. 3,167,429.

BACKGROUND OF THE INVENTION

In recent years the need for structural plastic parts has increased rapidly. Thus directionally reinforced resin sheets which can be molded into structural automotive parts such as transmission supports, door beams and the like have been produced. These directionally reinforced sheets contain glass strands which have been helically wound on a mandrel in a crisscross pattern and in amounts ranging between 60 to 80 percent by weight glass. While moldable glass reinforced sheets of a high glass content produce parts having excellent structural strength when molded, it is often desired to provide better modulus characteristics than normally realized. Carbon fibers in molded parts are known to impart good modulus characteristics to resin parts in which they are employed. Blends of glass and carbon fibers in resins have thus been used to utilize the qualities of strength and modulus that each provides to a resin matrix. In attempting to wind carbon fibers with glass fibers in the preparation of resin reinforced sheeting, considerable difficulty has been encountered processing the carbon strands. Thus, frequently the carbon fibers which are in strand form break in the resin bath or the die. This appears to be caused by the viscous drag on the strand going through the bath which causes the strand of carbon to filamentize, i.e., separate into the filaments forming it, and ultimately break out. In accordance with the instant invention, a method has been developed to wet the carbon strand with resin and combine it with the glass strands to provide a useful composite strand for forming resin sheet reinforced with both carbon and glass strand.

THE PRESENT INVENTION

In accordance with a process of the instant invention, novel carbon and glass strands are wound on a mandrel to prepare resin sheets. In the sheet preparation process the glass strands are fed from a glass supply into a resin bath where they are thoroughly wetted. The strands of glass are then passed through a die metering means which regulates the quantity of resin which is to be included with the glass strands. The carbon strand of the composite to be made is fed directly to the back of the die used to control the resin content of the glass strand and is contacted with the resin at the point where the resin backwashes from the die. Feeding the carbon strand at this point in the process eliminates the fiberizing of that strand, provides good wet out to the strand and permits it to be wound on the mandrel with the glass without the attendant breaks encountered when the carbon strand is fed through a resin bath. The composite strand of the invention is formed of resin, a plurality of glass strands and at least one carbon strand.

DETAILED DESCRIPTION OF THE INVENTION

In the preparation of glass-carbon resin reinforced sheet having structural characteristics and containing 55 to 80 percent glass and carbon with 20 to 45 percent resin by weight, the strands of carbon and glass are first coated with a resin and then are wound on a rotating mandrel.

In the discussion of the process, reference will be made to the accompanying drawing in which.

Figure 1:
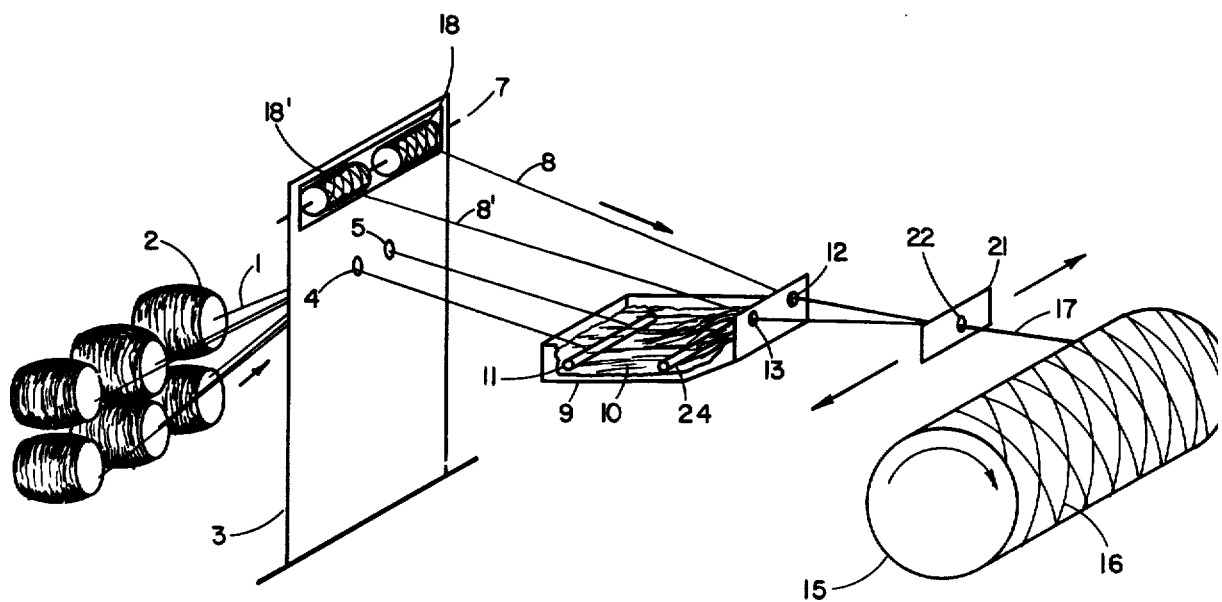
FIG. 1 is a flow sheet in perspective of the equipment used to manufacture the resin-glass-carbon sheets of the instant invention.
Figure 2:
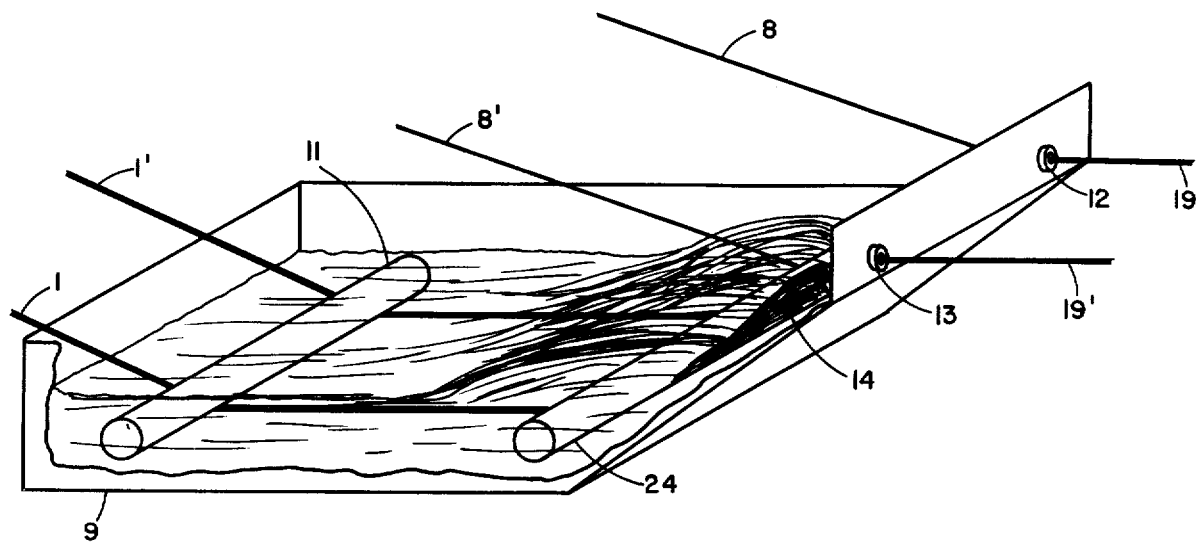
FIG. 2 is an enlarged view in perspective of the resin application section of the process depicted in FIG. 1.
Figure 3:
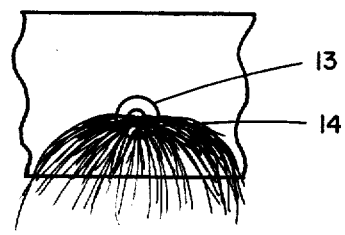
FIG. 3 is a section view looking into the resin application pan 9 to show the die 13 and point of entry of the carbon strand.

In the preparation of the resin-glass-carbon composites of the instant invention a plurality of glass strands are used. As shown in FIG. 1 for illustrative purposes, only six glass fiber forming packages 2 are employed. These packages 2 are mounted on a stand or creel, not shown, and the glass strand ends 1 from each of the packages are threaded through eyelets 4 and 5 mounted on the wall member 3, typically a sheet metal plate. In the illustration of FIG. 1 the upper row of glass forming packages have their strands ends 1 passed through eyelet 5 and the lower row strands ends 1 are passed through eyelet 4. The physically combined strands form two glass ribbons 1' which are passed under the retaining bars 11 and 24 of the resin tank 9. These strands 1' and 1 are then fed through the dies 12 and 13 and located at the forward end of the pan 9. Mounted on the top of the wall 3 are two packages 18 and 18' which contain carbon strands 8 and 8', respectively. The carbon strands 8' and 8 are introduced into the dies 12 and 13, respectively, by passing them through the resin backwash 14 accumulating as the dies wipe resin from the surface of the glass strands 1' and 1. The consolidated glass-carbon strands 19 and 19', which exit the dies 13 and 12, are then consolidated into a band of coextensive glass and carbon strands 17 in guide eyelet 22 located on a traveling guide 21 and this ribbon is wound on a rotating mandrel 15 to the desired thickness. After the composite reaches its desired thickness, the mandrel 15 is stopped and the resulting sheet is cut from its surface and the process is repeated.

The process generally depicted in the drawing is obviously subject to many variables. Thus, while only a one strand ribbon 17 is shown in the drawing as being wound on the mandrel 15, this is solely for illustrative purposes. The mandrel may have a band or ribbon of many collimated parallel composite strands wound at the same time on its surface. Similarly the number of glass ends used to form the strands at 1' can be varied. Thus one end can be used as the strand 1' or any multiple of ends can be used to form the strand 1'. Typically the number of ends employed to form the strands 1' has ranged from 1 to 10 or more. The width of the band 17 desired in the final produce determines the number and diameter of strands that will be used to form the band. By width of band is meant the width measured perpendicular to the band direction.

In the process shown in the drawing the mandrel 15 is rotating in a clockwise direction on a shaft, not shown, which is driven by a suitable motor. The guide plate 21 reciprocates in a horizontal plane and lays the composite strand 17 down on the surface of the mandrel 15. The strand 17 is normally laid on the mandrel 15 at a predetermined helix angle to provide directional reinforcement properties to the finished sheet. The helix angle is the included acute angle created by the intersection of the band 17 on the body of the mandrel 15 with a line on the body of the mandrel parallel to the longitudinal axis of the mandrel. This angle for the structural sheets produced by this process is generally in the range of 60 to 89 degrees. The wind angle of the mandrel in relation to the strand 17 is the included acute angle created by the intersection of the band 17 on the body of the mandrel 15 with a line on the body of the mandrel perpendicular to the longitudinal axis of the mandrel. In a typical use of the process this angle is between 30 to 1 degrees.

In the normal operation the mandrel 15 rotates continuously during the process and the guide 21 reciprocates in a horizontal plane causing the ribbon or band 17 to be laid down on the mandrel 15 in a crisscross fashion to form layers of composite on the surface of the mandrel. For purposes of this disclosure a layer is formed when the band 17 has covered the mandrel in both traversing directions. The finished sheet containing the glass and carbon strands will contain the number of layers desired to produce a produce of the desired density in pounds per square foot.

The resin pan 9 during the operation is constantly supplied with resin 10 to insure that sufficient resin is maintained in the pan 9 to thoroughly wet the glass strands 1 and 1' which are passed through it under the bars 11 and 15. This can be done continuously by providing an automatic feed inlet and overflow system or the resin can be added manually as required. The pan 9, depending on the width of the mandrel 15 can remain stationary or it can be reciprocated in a horizontal plane coordinated with the movement of the plate 21.

The strand and article of the invention may be formed using any suitable resin. Typical of suitable thermoplastic resins are thermoplastic resins such as polyethylene, polypropylene and polystyrenes. The thermosetting resin employed in the system may include many types and typically resins such as vinyl esters, quick curing epoxy resins and general purposes polyester resins have been employed. Isophthalic polyester resins have been found to be particularly effective in making the composites of this invention and are preferred. Resins such as B-stage curing epoxy resins and thickened polyesters are desirable as they may be stored after removal from the mandrel and then cut and molded to cure at a later date. Typically polyesters which may be employed in the invention are the class of resins shown and described in U.S. Pat. No. 3,840,618, incorporated herein by reference.

An important consideration in preparing composites is the regulation of the resin content of the final product. In this process this is accomplished by regulating the size of the orifice in the dies 12 and 13. In general it has been found desirable to maintain these orifices in the range of 0.014 to 0.078 inch.

The graphite strands fed to the system may be pulled directly from the wall member 3 as shown or can be drawn from a creel placed closer to the front end of the pan 9. The point of entry of the carbon strand in the resin pan is an important consideration in achieving success in forming the composite ribbons or bands 19 and 19' however. The residence time and drag on the carbon strand must be minimized to prevent damage or degradation to the strand. Thus, it is important that the carbon strand be introduced into the process at or close to the entrance to the dies and preferably in the central area of the resin backwash of that die. This prevents the carbon strand from receiving any excessive strain of being pulled through the resin and allows the strand of carbon to enter the system with little or no viscous drag applied to it.

The sheet composites and composite strands produced by this process on a volume basis generally contain 50 to 5 percent carbon strand and 5 to 50 percent glass strand. However, it is within the invention to have on a volume basis between about 20 percent and 95 percent glass and between about 80 percent carbon and about 5 percent carbon strand. This corresponds to between about 35 and about 98 percent by weight glass strand and about 65 percent to 2 percent by weight carbon. The strands of carbon and glass are fed to the system and the composite strand wound on the mandrel at speeds ranging between 50 and 500 feet per minute.

The resins used are supplied to the composite strands and typically the sheets formed are placed between two layers of clear sheet such as polyethylene. Thus in practice the surface of the mandrel is covered with a polyethylene sheet prior to winding the resin containing composite strand. When the requsite number of layers have been applied to the mandrel, the mandrel is stopped and the composite sheet is covered with another layer of polyethylene sheet and then cut from the mandrel. By sandwiching the composite sheet between the polyethylene layers, the resin composite can be readily handled and stored until a molded part is to be made from it. Heat applied to the composite sheet during molding converts the sheet product into a thermoset, hardened part.

Carbon strands are produced by treating organic fibers by pyrolysis to produce strands of carbon fibers. Thus, carbon filaments have been produced by pyrolyzing rayon precursor yarns, polyacrylonitriles and the like. Several of these strands are available in industry today and have been described in the literature. (*Modern Plastics Encyclopedia*, 54, 10A, page 172, Oct. 1977; *Advanced Materials*, C. Z. Carroll-Porczynski, Chemical Publishing Co., N.Y. 1962; *Industrial Chemistry*, 7th Ed., pg. 342, Van Nostrand Reinhold Co., N.Y., 1974.) A particularly useful strand for use in the instant process is a carbon fiber called CELION ® manufactured by Celanese Corporation.

In a typical application of the present process a resin-glass-carbon sheet was made by filling the resin pan with a resin mixture containing 90 parts of an isophthalic polyester resin, 10 parts of styrene monomer, 0.5 part of zinc stearate, 1 part tertiary butylperbenzoate and 3.5 parts of magnesium oxide thickener.

Twelve glass fiber forming packages were mounted on a creel, each of the packages containing K-37 glass strands. These strands have 400 glass filaments, each filament having a diameter of 0.0005 inch. Three glass ribbons were prepared by pulling strands from four packages and combining them prior to introducing them into the resin pan. A total of three glass ribbons were passed through the resin pan continuously at a rate of 100–200 feet per minute. The resin pan containing the resin mixture referred to above was maintained constantly supplied with resin during the run. The three glass strands passing through the resin pan were with-drawn through three precision dies, each having a diameter of 0.045 inch. Three carbon strands were fed into the system by passing one of each into a die through which each of the three glass ribbons was being fed and on the resin pan side of the die so that the carbon strand entered the die near the center portion in the backwash of resin that was generated by the die in wiping excess resin from the surface of the glass ribbon being fed thereto. In passing through the die, the carbon strand becomes wetted with the resin contained in the die and the backwash and is physically combined with the glass ribbon passing through the die to thereby form three consolidated glass-carbon bands or ribbons. These three consolidated ribbons were passed through three guide eyes positioned on a reciprocating guide device positioned above a rotating mandrel. The strands were wound on the surface of the mandrel in side by side relationship at a helix angle of 85.4 degrees and a wind angle of 4.6 degrees. The reciprocating guide was passed back and forth above the surface of hte mandrel and the consolidated strands were wound until three layers were laid on the mandrel surface. The mandrel was then stopped and the composite strand-resin sheet was removed. The finished sheet was cut to a blank size for molding flat panels. Panels were molded from these blanks on a press and formed satisfactory structural panels.

While the invention has been described with winding of the strands onto a mandrel it is also possible to use the composite strand of resin, carbon and glass in other ways. The strand would be wound onto spools for later use. The spools could be unwound for use in winding at remote locations. The spools also could be used in weaving woven reinforcement or used in only certain portions of articles where extra reinforcement was desirable. The strands could also be wound together to form cables. Further the strands could be fed directly from the bath onto a belt in swirls and then into a laminator.

While the invention has been described with reference to certain specific embodiments, it is not intended to be limited thereby except insofar as appears in the accompanying claims.

I claim:

1. A composite strand comprising resin, a plurality of continuous glass fiber strands and at least one continuous carbon fiber strand wherein said glass and carbon strands are coextensive.

2. The composite strand of claim 1 wherein said resin comprises a heat curable polyester.

3. The composite strand of claim 1 wherein the carbon and glass fiber strands in said composite are between about 35 and about 98 percent by weight glass and between 65 and 2 percent by weight carbon.

4. The composite strand of claim 3 wherein said resin content is between about 20 and about 45 percent by weight of said composite.

5. The composite strand of claim 1 wherein said resin is selected from the group consisting of polyethylene, polypropylene, polyamides, polyurethanes, polyesters, epoxies and mixtures thereof.

6. The composite strand of claim 1 wherein said strand is impregnated with a resin comprising thickened uncured polyester.

7. The composite strand of claim 1 impregnated with a B-stage cured resin.

8. The strand of claim 1 wherein the strand is wound on spools.

9. The strand of claim 1 wherein the carbon and glass fiber strands in said composite comprise on a volume basis between about 50 and about 5 percent carbon and between about 5 and about 50 percent glass.

10. A fiber resin composite article comprising helically wound strands and resin wherein said helically wound strands comprise composite strands comprising resin, a plurality of continuous glass fiber strands and at least one continuous carbon fiber strand wherein said glass and carbon strands are coextensive.

11. The composite of claim 10 wherein said composite was wound at a helix angle of about 85.4 degrees.

12. The composite of claim 10 wherein there are three layers of helically wound strands.

13. The composite article of claim 10 wherein said resin comprises a heat curable polyester.

14. The composite article of claim 10 wherein the carbon and glass fiber strands in said composite strands are between about 35 and about 98 percent by weight continuous glass fibers and between 65 and 2 percent by weight continuous carbon fibers.

15. The composite article of claim 10 wherein said strands are inpregnated with a resin comprising thickened uncured polyester.

16. The composite article of claim 10 impregnated with a B-stage cured resin.

17. The composite article of claim 10 wherein the carbon and glass fiber strands in said composite strands comprise on a volume basis between about 50 and about 5 percent carbon and between about 50 percent glass.

18. The composite article of claim 14 wherein said resin content is between about 20 and about 45 percent by weight of said composite.

19. The composite article of claim 10 wherein said resin is selected from the group consisting of polyethylene, polypropylene, polyamides, polyurethanes, polyesters, epoxies and mixtures thereof.

* * * * *